(12) United States Patent
Herrmann et al.

(10) Patent No.: US 11,180,088 B2
(45) Date of Patent: Nov. 23, 2021

(54) MOUNTING ASSEMBLY FOR AN EXTERIOR ATTACHMENT DEVICE, REARVIEW DEVICE AND MOTOR VEHICLE

(71) Applicant: SMR Patents S.à.r.l., Luxembourg (LU)

(72) Inventors: Andreas Herrmann, Stuttgart (DE); Ilka Rötzer, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 16/059,721

(22) Filed: Aug. 9, 2018

(65) Prior Publication Data

US 2019/0047486 A1 Feb. 14, 2019

(30) Foreign Application Priority Data

Aug. 10, 2017 (DE) ...................... 20 2017 104 834.9

(51) Int. Cl.
*B60R 11/00* (2006.01)
*B60R 11/04* (2006.01)

(52) U.S. Cl.
CPC ......... *B60R 11/04* (2013.01); *B60R 2011/004* (2013.01); *B60R 2011/0059* (2013.01);
(Continued)

(58) Field of Classification Search
CPC .. B60R 11/04; B60R 1/12; B60R 1/02; B60R 1/06; B60R 2001/1215; B60R 2011/0059; B60R 2011/0061; B60R 2011/004; B60R 2011/0096; F16B 5/06; F16B 2001/0064; B60Q 1/2665; Y10T 29/49936;
(Continued)

(56) References Cited

U.S. PATENT DOCUMENTS

| | | | | |
|---|---|---|---|---|
| 2,744,769 A | * | 5/1956 | Roeder .................. | H02G 3/065 16/2.2 |
| 3,799,483 A | * | 3/1974 | Chiappinelli ....... | B60R 11/0205 248/27.3 |

(Continued)

FOREIGN PATENT DOCUMENTS

| | | | | |
|---|---|---|---|---|
| DE | 9317983 U1 | * | 12/1994 | .............. F16L 3/233 |
| DE | 10043168 A1 | | 3/2002 | |

(Continued)

*Primary Examiner* — Steve Clemmons
(74) *Attorney, Agent, or Firm* — Jones Day

(57) ABSTRACT

A mounting assembly for an attachment device of a vehicle includes receiving or holding means on a rearview device of the vehicle, the receiving or holding means being adapted so that the attachment device can be fixed by means of at least one fixing means of the attachment device in operative connection with at least one complementary fixing means of the receiving or holding means, where at least one of the at least one fixing means of the attachment device or the receiving or holding means is configured to be in operative connection, where after fixation, the attachment device cannot be released from the fixing means without destruction, and at least one of the at least one fixing means of the attachment device or the complementary fixing means of the receiving or holding means includes at least one of a clip, an undercut and a latch.

7 Claims, 2 Drawing Sheets

(52) U.S. Cl.
 CPC ............... *B60R 2011/0061* (2013.01); *B60R 2011/0096* (2013.01)

(58) Field of Classification Search
 CPC ........... Y10T 29/4913; Y10T 29/49821; Y10T 29/49822; Y10T 29/4987; Y10T 29/49876
 See application file for complete search history.

(56) References Cited

U.S. PATENT DOCUMENTS

| | | | | |
|---|---|---|---|---|
| 4,106,802 A * | 8/1978 | Lozio | ................... | G09F 3/0311 292/320 |
| 4,488,206 A * | 12/1984 | Mizusawa | ........... | B60Q 1/0441 24/289 |
| 5,169,105 A * | 12/1992 | Yasukawa | ........... | B60R 11/0241 224/929 |
| 5,765,310 A * | 6/1998 | Gold | .......................... | B60J 1/17 49/375 |
| 5,890,831 A * | 4/1999 | Kato | ....................... | B60N 2/015 248/503.1 |
| 7,137,717 B2 * | 11/2006 | Ohashi | .................... | B60R 1/072 359/877 |
| 7,258,471 B2 * | 8/2007 | Barros | ................ | B60Q 1/2665 362/494 |
| 7,448,589 B2 * | 11/2008 | Blakeman | ................ | B60R 1/06 248/475.1 |
| 7,944,371 B2 * | 5/2011 | Foote | .................. | B60Q 1/2665 340/903 |
| 8,162,693 B2 * | 4/2012 | Auray | .................... | H02G 3/083 174/657 |
| 8,556,643 B2 * | 10/2013 | Pevoteaux | ........... | H01R 13/629 439/248 |
| 8,696,179 B2 * | 4/2014 | Pastrick | ............... | B60Q 1/2665 362/494 |
| 8,791,374 B1 * | 7/2014 | Smith | .................. | H02G 3/0616 174/530 |
| 8,919,973 B2 * | 12/2014 | Schmierer | .............. | G02B 7/182 248/475.1 |
| 8,979,288 B2 * | 3/2015 | Negel | ....................... | B60R 1/06 248/477 |
| 9,300,095 B2 * | 3/2016 | Lin | ........................ | H01R 24/60 |
| 9,896,024 B1 * | 2/2018 | Smith | .................... | B60Q 1/263 |
| 9,917,388 B2 * | 3/2018 | Dumpler | .............. | H01R 13/025 |
| 10,251,296 B2 * | 4/2019 | Nakamura | ................ | F16B 1/00 |
| 10,329,808 B2 * | 6/2019 | Platas | ................. | B60R 25/1001 |
| 2002/0001147 A1 * | 1/2002 | Zapadinsky | .............. | B60R 1/06 359/838 |
| 2017/0267179 A1 * | 9/2017 | Hermmann | .......... | B60Q 1/2665 |
| 2018/0124878 A1 * | 5/2018 | Fritz | ......................... | B60R 1/12 |
| 2018/0126910 A1 * | 5/2018 | Hermmann | ............. | B60R 1/072 |
| 2018/0319350 A1 * | 11/2018 | Ji | ............................ | B60R 11/04 |

FOREIGN PATENT DOCUMENTS

| | | |
|---|---|---|
| DE | 102016202307 A1 | 8/2017 |
| WO | WO 2005/044 625 A1 | 5/2005 |

* cited by examiner

MOUNTING ASSEMBLY FOR AN EXTERIOR ATTACHMENT DEVICE, REARVIEW DEVICE AND MOTOR VEHICLE

CROSS-REFERENCE TO RELATED APPLICATION

This application claims the benefit of foreign priority to German Patent Application No. DE 20 2017 104 834.9, filed Aug. 10, 2017, which is herein incorporated by reference in its entirety for all purposes.

BACKGROUND

1. Field of the Invention

The following description relates to a mounting assembly for an exterior attachment device of a motor vehicle as well as a rearview device and a motor vehicle each having holding means for such a mounting assembly.

2. Related Art

In typical motor vehicles, external attachment devices are increasingly used, such as cameras, lighting modules, logo displays, external sensors for driver assistance system and the like. It is desirable to make external attachments retro-fittable so that a motor vehicle can be configured according to the wishes of its owner even after its production.

WO 2005/044 625 A1, for example, describes a lighting device which can be used in a housing of an exterior mirror of a motor vehicle. The device is installed inside the rear view mirror housing using a frame which is solidly connected to the housing with the frame including mobile coupling means which enable the device to adopt at least two positions in relation to the housing, namely: at least one first working position in which the cover is essentially flush with the lower part of the rear view mirror housing, the light source illuminating an area immediately below the rear view mirror; and a second position in which the light source can be replaced.

DE 100 43 168 A1 describes a method for fastening an electronic identification device to a vehicle and identification device.

DE 10 2016 202 307 A1 describes a holder for a sensor including a mounting surface for attaching the holder to a panel of a vehicle, the mounting surface including: a sensor opening for receiving the sensor, a first mounting bump completely surrounding the sensor opening, and a plurality of second mounting bumps only partially surrounding the sensor opening, the first mounting bump and the second mounting bump are adapted for attachment to the panel.

However, such attached external attachment devices are in return also easy to remove, which brings a considerable theft risk especially for high-quality modules, such as cameras.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. In one aspect, a mounting assembly for an exterior attachment device which offers particularly good protection against theft of such external attachment devices is described.

In an aspect, a mounting assembly for an exterior attachment device of a motor vehicle includes holding means on the motor vehicle, in particular on an exterior rearview device of the motor vehicle, with the holding means being adapt such that the exterior attachment device can be fixed by means of at least one fixing means of the exterior attachment device in operative connection with at least one complementary fixing means of the holding means, where at least one of the fixing means of the exterior attachment device or the holding means, in particular the fixing means of the holding means, are designed so that in operative connection after fixation the exterior attachment device cannot be released from the fixing means without destruction, and at least one of the at least one fixing means of the exterior attachment device or the complementary fixing means of the holding means includes at least one of clip means, an undercut and latching means.

After a theft of the exterior attachment device the same, therefore, may no longer be used in the receiving or holding means of another motor vehicle and, thus, may be worthless to the thief.

In order to remove the exterior attachment device in nondestructive manner, the entire receiving or holding means may have to be dismantled, which is possible only with a high expenditure of time and possibly in a workshop, while improper removal of the exterior attachment device is possible only with the destruction or damage. This increases the risk and the cost of a potential thief, so that the theft of an exterior attachment device from such a mounting assembly is no longer worthwhile.

As at least one of the at least one fixing means of the exterior attachment device or the complementary fixing means of the holding means may include at least one of clip means, an undercut, and latching means for a simple and quick installation of the exterior attachment.

Furthermore, for example, a clip connection may be designed in a particularly simple manner so that it is not be detached in a non-destructive manner.

The at least one fixing means of the attachment means may have at least one predetermined breaking point. The predetermined breaking point may be designed to break when the connection between the fixing means is released.

When releasing the connection, the fixing means may break at the predetermined breaking point so that the external attachment is unusable.

The material thickness of the predetermined breaking point may be preferably set so as to destroy when releasing the fixing, but on the other hand, the forces acting in normal operation may not cause damage to the fixing.

The exterior attachment device may have at least one electrical connection means, with the electrical connection means getting in electrical operative connection during fixing the exterior attachment device with the complementary electrical connection element of the receiving or holding means.

This allows a particularly simple installation of the external attachment device, which works without additional steps (such as cabling).

The at least one electrical connection means of the exterior attachment device may be at least one of self-locating and self-centering.

This also contributes to a particularly simple assembly, since no further manipulations are necessary in order to correctly couple the connecting means with each other.

The at least one electrical connection element of the exterior attachment device may be designed so that it cannot be released after fixing the exterior attachment device without destruction This further increases theft security. Just a damage of the electrical components in the unauthorized removal of the external attachment device may reduce its value so that a theft of such an exterior attachment device is not worthwhile.

The exterior attachment device may include at least one camera, a light, a light module, a microphone, a loudspeaker, a display, a reflection element, an antenna, a sensor and/or a projector.

By means of such individually retrofittable components, a plurality of additional functions and/or aesthetic improvements for the motor vehicle may be provided.

It is possible, for example, to use the external attachment parts in a mirror housing of an exterior mirror of the motor vehicle.

In another aspect, a rearview device and a motor vehicle for a mounting assembly are described.

Again, the advantages described above come into play.

A rearview device for a motor vehicle may provide at least a legally compliant image of the rear of the motor vehicle and belongs to a subset of devices for indirect vision.

These may provide images and views of objects that are not in the direct field of vision of a driver, that is, in directions opposite, left, right, below, and/or above the driver's line of sight.

The driver's gaze may not be completely satisfactory especially in the viewing direction, for example, obstructions can be caused by vehicle parts of the driver's own vehicle, such as parts of the bodywork, in particular the A-pillar, the roof construction and/or the hood, and visual obstructions generated by other vehicles and/or objects outside the vehicle, which can obstruct the view such that the driver can not completely satisfactory or incomplete capture a driving situation.

In addition, it is possible that the driver may be unable to grasp the situation present to him in or off his field of view as it would be necessary to control the vehicle accordingly.

A review device may also be configured to process information according to the capabilities of the driver to enable him to best capture the situation.

Various functions and devices can be installed in rear view devices and/or controlled by means of rear view devices, including cameras.

Functions and devices are particularly useful for improving, extending and/or maintaining the functionality of the review device under normal or extreme conditions. Here, heating and/or cooling devices, cleaning agents such as wipers, liquid and/or gaseous sprays, actuator means for moving the rearview device or parts thereof, such as a display, a camera system and/or parts of a camera system including, for example, lenses, filters, light sources, adaptive optics such as deformable mirrors, sensors and/or mirrors, and/or actuator means for inducing motions of other objects, for example parts of the vehicle and/or objects surrounding the vehicle, may be included.

Other devices can be integrated in rearview devices, and/or other devices can be controlled by means of rearview devices, such as any type of light module including an external light module, an internal light module, a headlight, a tail light, a fog light, a brake light, an acceleration light, a flashing light, a logo light, an apron light, a ground light, a puddle light, a flashlight, a navigation light, a position light, an emergency light, a headlight, a green light, a red light, a warning light, a flashing light, a proximity light, a search light, an information light, a display and/or the like. Other examples of functions and devices that are integrated in reviewing devices and/or controlled by reviewing devices may include, for example, a fatigue detection system, a microsleep detection system, a distance and/or speed determination system, such as a LIDAR (Light Detection and Distance Detection) system, a blind spot indication system, a lane change assistance system, a navigation assistance system, a tracking assistant system, a human-machine interaction system, an engine-machine interaction system, an emergency and precautionary assistance system, such as an accident avoidance assistance system, a countermeasure assistance system, a brake assist system, a steering assist system, an acceleration assistance system, an escape assist system including, for example, an ejection seat system, a direction indicator, a blind spot indicator, an approach system, an emergency brake system, a cargo status display, a vehicle-mode system that includes, for example, a sports-mode system, an economy-mode system, an autonomous-driving-mode system, a sleep-mode system, and/or an anti-theft system, a vehicle-sealed indication system, include a vehicle-stolen display, a warning signal system, a temperature indicator system, a weather indication system, a traffic signal system, a fuel status system, and/or any combination thereof.

Illuminators for rearview devices and/or optical fibers are also described in German Patent Application No. 102012108488, German Patent Application No. 102012104529, in German Patent Application No. 102012107833, German Patent Application No. 102012107834, European Patent No. 2738043, US Pat European Patent No. 2947378, International Patent Application No. 2015/173695, European Patent Application No. 3045944, U.S. patent application Ser. No. 15/228,566, U.S. patent application Ser. No. 15/000,733, International Patent For example, U.S. Patent Application No. 2016/147154, U.S. patent application Ser. No. 15/256,532, German Patent Application No. 102015115555, European Patent Application No. 3144183, assigned to the Applicant.

Projection devices for projecting optical information may find application in a motor vehicle, for example, to project a manufacturer's logo or a warning signal onto an area located outside the motor vehicle.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

DESCRIPTION

Figure 1:
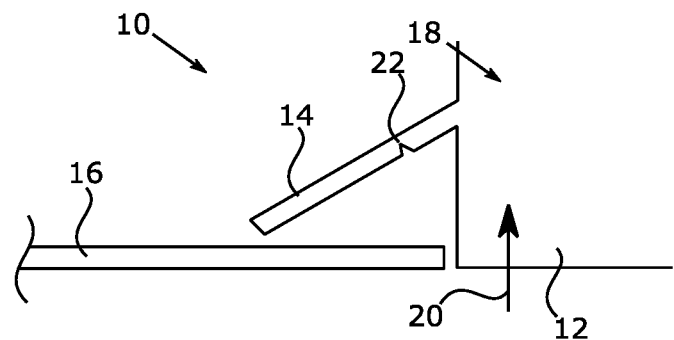
FIG. 1 is a diagram illustrating an example of a schematic detail sectional view of a fixing means of a first mounting assembly for an external attachment device of a motor vehicle.
Figure 2:
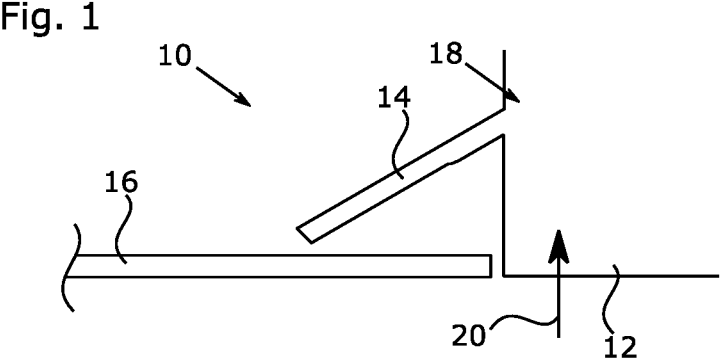
FIG. 2 is a diagram illustrating an example of a schematic detail sectional view of a fixing means of a second mounting assembly.
Figure 3:
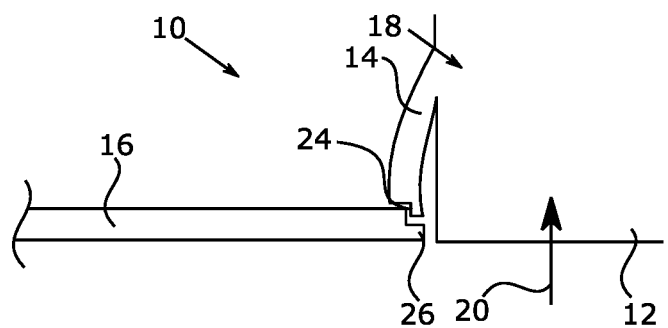
FIG. 3 is a diagram illustrating an example of a schematic detail sectional view of a fixing means of a third mounting assembly.
Figure 4A:
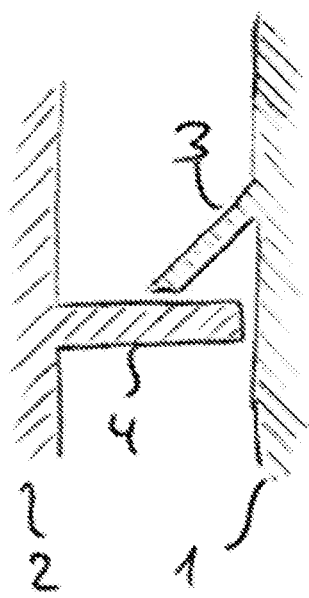
FIGS. 4A, 4B, 4C, and 4D are diagrams illustrating another schematic detail sectional view of the fixing means.
Figure 4B:
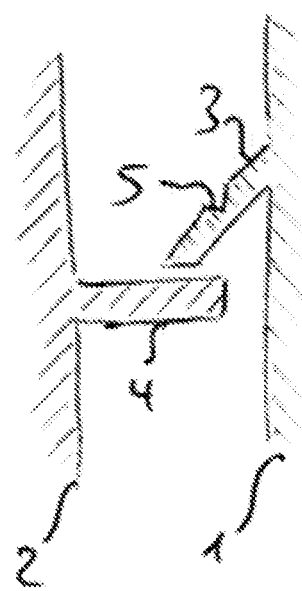
Figure 4C:
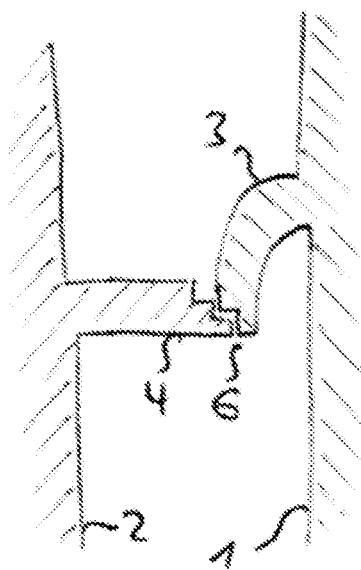
Figure 4D:
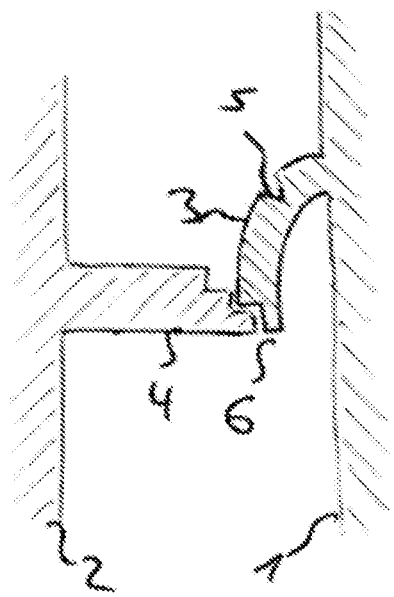

FIG. 1 to FIG. 3 are diagrams which illustrate detailed views of examples of a mounting assembly 10 for an exterior attachment device 12 of a motor vehicle.

The exterior attachment device 12 includes, for example, a camera, a lighting module, a logo display, a sensor for a driver assistance system, other imaging or display units, or combinations thereof.

The attachment device 12 may include a fixing means 14 which, in this example, is in the form of a clip connector. The fixing means 14 may include a clip, projection, extension arm, clamp, latch, or protrusion.

In the installed state of the exterior attachment device 12, the fixing means 14 engages a complementary fixing means 16 of a receiving or holding means 18 for the exterior attachment device 12. The receiving or holding means may include, for example, a bracket, an opening, a receptacle, a holder, among other holding structures.

If the external attachment device 12 is inserted in the direction of the arrow 20 in the receiving or holding means 18, then the fixing means 14 may bend through and spring back in the end position of the attachment device 12 in the position shown in order to produce the desired rear grip.

A removal of the attachment means device 12 against the direction of the arrow 20 is no longer possible in a nondestructive manner, which secures the exterior attachment device 12 against theft.

It is possible, as shown in FIG. 1, to additionally provide the fixing means 14 with a predetermined breaking point 22 in order to prevent a non-destructive removal of the attachment device 12. The breaking point 22 may be in the form of a cut into the material of the fixing means 14 which allows the fixing means to bend without breaking.

However, such a predetermined breaking point 22 can also be omitted, as shown in FIGS. 2 and 3. The fixing means 14 may also include a positive locking means 24, which engages in a complementary form-fitting means 26 of the motor vehicle-side fixing means 16. The positive locking means 24 and the form-fitting means 26 may include complimentary steps formed at the ends of the fixing means 14 and the motor vehicle-side fixing means 16, respectively.

For fixation of the attachment device 12, a plurality of fixing means 14 of the type shown are preferably used, in particular more than three such fixing means 14. However, any number of fixing means 14 may be used.

In addition, the external attachment device 12 may still have electrical connection elements which interact with the insertion of the external attachment device 12 into the receiving or holding means 18 acting as a receptacle 18 with complementary electrical connection elements of the motor vehicle.

These electrical connection elements are not shown in the figures for clarity. The electrical connection means are preferably self-locating or self-centering in order to allow a particularly simple mounting of the external attachment device 12. Furthermore, the electrical connection elements themselves may still have clips, clamping or latching connectors which likewise cannot be detached in a non-destructive manner in order to further complicate theft of the exterior attachment device 12.

The bracket like receiving or holding means 18 and/or the exterior attachment device 12 may further alternatively or additionally include devices that damage the exterior attachment device 12 at an illegal removal. For example, for this purpose, adhesive or color cartridges can be provided, which discharge in response to improper removal of the exterior attachment device 12 and make this unusable. Also, prestressed bolts or the like, which mechanically damage the external attachment device 12 in this case, may be used.

Accordingly, a mounting assembly for an exterior attachment device 12 may protect the exterior attachment device 12 particularly well against theft.

FIGS. 4A-4D illustrate detailed sectional views of the fixing means including the external attachment device 1, the receiving or holding means 2, the fixing means 3 (being a clip in FIGS. 4A-4D, the fixing means 4 (being a complementary clip in 4A-4D, the predetermined breaking points 5, and the positive locking means 6.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

LIST OF REFERENCE NUMBERS 10 mounting assembly
12 external attachment means
14 fixing means
16 fixing means
18 receiving or holding means
20 arrow
22 predetermined breaking point
24 positive locking means
26 positive locking means

The invention claimed is:

1. A mounting assembly for an exterior attachment device of a motor vehicle, comprising:
   receiving or holding means on an exterior rearview device of the motor vehicle, the receiving or holding means being adapted so that the exterior attachment device can be fixed by means of at least one fixing means of the exterior attachment device in operative connection with at least one complementary fixing means of the receiving or holding means, the at least one fixing means being formed as a unitary, undivided member,
   wherein at least one of the at least one fixing means of the exterior attachment device or the complementary fixing means of the receiving or holding means is configured to be in operative connection so that after initial fixation, the exterior attachment device cannot be released from the at least one complementary fixing means without destroying the at least one fixing means,
   at least one of the at least one fixing means of the exterior attachment device or the at least one complementary fixing means of the receiving or holding means comprises at least one of a clip, an undercut and a latch,
   the at least one fixing means bends and springs back in the operative connection with the at least one complementary fixing means after fixation,
   the at least one fixing means of the exterior attachment device has at least one predetermined breaking point, and the predetermined breaking point is configured to break in response to the connection between the at least one fixing means and the at least one complementary fixing means being released.

2. The mounting assembly according to claim 1, wherein the exterior attachment device comprises at least one electrical connection, the electrical connection configured to be in electrical operative connection during fixing of the exterior attachment device with a complementary electrical connection element of the receiving or holding means.

3. The mounting assembly according to claim 2, wherein the at least one electrical connection of the exterior attachment device is at least one of self-locating and self-centering.

4. The mounting assembly according to claim 2, wherein the at least one electrical connection element of the exterior attachment device is fixed to the exterior attachment device.

5. The mounting assembly according to claim 1, wherein the exterior attachment device comprises at least one of a camera, a light, a light module, a microphone, a speaker, a display, a reflection element, a mirror, an antenna, a sensor, and a projector.

6. A rearview device comprising a holding means for a mounting assembly according to claim 1.

7. A motor vehicle comprising a holding means for a mounting assembly according to claim 1.

\* \* \* \* \*